though high-grade iron ores are rapidly

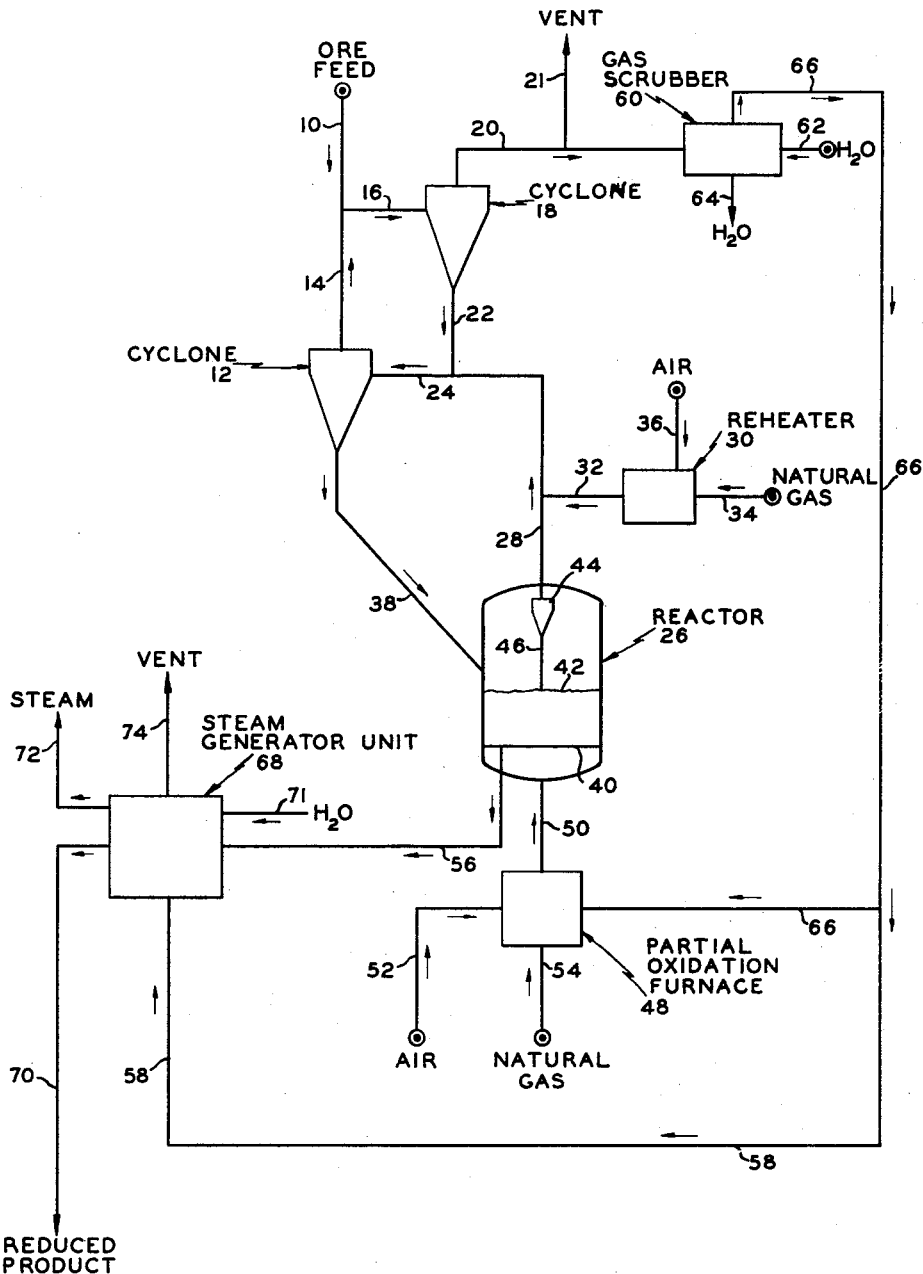

United States Patent Office 3,160,499
Patented Dec. 8, 1964

3,160,499
METHOD FOR REDUCING METAL OXIDES
Robert W. Pfeiffer, Bronxville, and Luther W. Garrett, Jr., Pleasantville, N.Y., assignors, by mesne assignments, to Pullman Incorporated, a corporation of Delaware
Filed June 28, 1961, Ser. No. 120,285
12 Claims. (Cl. 75—26)

This invention relates to a method for the reduction of metal oxides, and in one of its aspects, relates more particularly to an improved method for up-grading low-grade metal oxides, e.g., oxides of iron, copper, nickel or manganese. Still more particularly, in this aspect, the invention relates to a method for reducing and up-grading low-grade oxide ores, particularly iron oxide ores, to permit their extensive utilization in the production of iron or steel in an economic manner.

One of the most important problems confronting the iron and steel industry at the present time is the rapid depletion of high-grade iron ores in the United States, and the steel industry is therefore concerned with the need for the development of methods which will permit the utilization of low-grade iron ores, such as are found in the Lake Superior district. In this respect, the current trend in the United States for processing only high-grade iron ores or beneficiated concentrates containing 60 percent or more of iron, means that unless low-grade ores can be utilized, the commercially usable ores in this district will be exhausted within a relatively short period. Thus, the development of suitable methods for the concentration of an almost inexhaustible supply of low-grade ores is essential to the iron and steel industry. In order to develop such methods, commercial research has involved the studying of new and old concentration processes. The most important processes for ore concentration are, in general, magnetic concentration of natural magnetites, size separation and gravity concentration. In this respect, it is found that most of the lean ores in the Lake Superior and other districts are not magnetic and that the iron oxide and the gangue minerals are of such size range or mineralogical type that gravity concentration has been found to be impractical. Flotation processes have also been experimented with, quite extensively; however, because of the complex nature of the ore (the iron usually occurring in the form of hematite, magnetite, limonite and iron carbonate), the flotation methods that have been developed are often complicated and expensive. Thus, as a result of the disadvantages of the gravity concentration and flotation processes, the magnetic roasting and concentration process to produce high-grade artificial magnetite has been receiving careful attention in recent years.

Processes for magnetic concentration of non-magnetic ores are based upon the practice of converting the oxides (or carbonates) in the non-magnetic ores to the magnetic oxides, and thereafter these ores can be concentrated by the methods normally employed for concentrating natural magnetites. The chemical reactions involved in the magnetic roasting of iron oxide are well-known, however, attempts to commercialize this process have usually resulted in failure. The major cause of these failures is the lack of adequate roasting equipment or apparatus, and as a result, the roasting costs have been prohibitive. Since the magnetic roasting process comprises only one step in the process of beneficiation, it becomes evident that the cost of magnetic roasting must be kept very low to render it economically attractive.

Magnetic roasting processes, previously proposed, employ a reduction reactor which may be one of the shaft furnace, traveling grate, multiple hearth, rotary kiln or fluidized solids unit types. Of these types, all but the last two will not handle fines, so that if wash plant tailings were to be used as a feed, there would be necessitated the inclusion of an agglomeration step in the roasting process. In addition, the operating and maintenance costs of several of the types mentioned above are very high. Furthermore, in practice, the efficiency of any of the aforementioned five types of reduction reactors has been found to be very low, in that over-reduction to wustite can occur due to failure to control reducing gas composition, or high fuel requirements or poor gas-solids contact is encountered thereby resulting in a high reducing gas consumption. The fluidized solids unit type reduction reactor eliminates many of the above disadvantages, but also introduces new difficulties, from a standpoint of ease of operation. If these difficulties could be overcome, the fluidized reduction reactor type system would offer a practical and economical means for conducting a roasting process for the up-grading of otherwise worthless iron ores.

It is, therefore, an object of the present invention to provide an improved method for reducing metal oxides. Another object of the invention is to provide an improved method for the reduction of metal oxides, such as oxides of iron, copper, nickel or manganese, in an economical and efficient manner.

Still another object of the invention is to provide an improved method for reducing and up-grading low-grade oxidic ores, particularly oxidic ores of iron, copper, nickel or manganese, to permit their extensive industrial utilization in an efficient and economical manner.

Various other objects and advantages inherent in the invention will become apparent from the following description and disclosure.

In accordance with the present invention, there is provided an improved method for the reduction of metal oxides under fluidization conditions, employing a fluidized-solids reduction-reactor type system, and in which a reactor having a single bed of fluidized solids is employed. Because the reactor has only a single bed of fluidized solids, the process presents an ease of operation that is unequalled by present-day commercial magnetic roasting processes, such as the shaft furnace, traveling grate, rotary kiln, multiple hearth-furnace or multiple-hearth fluidized bed types. The system of the present process is found to present an optimum combination of desirable features including, in addition to ease of operation, a high degree of heat utilization, operating and throughput flexibility, the ability to use various fuels or combinations of fuels, low space requirements per ton of capacity, and a relatively low investment.

In general, the improved process, as more fully hereinafter disclosed, is carried out by the reduction of the metal oxide, e.g., a hematite iron ore, in a fluid bed reactor. The reducing gas, employed for carrying out the reduction, is then withdrawn from the reduction zone. This gaseous effluent thus withdrawn is next heated to an elevated temperature, and is thereafter contacted one or more times with a mass of the fresh metal oxide to cause this mass to be heated to an elevated temperature. The thus-heated metal oxide is then separated from the gaseous effluent. Thereafter, the separated heated metal oxide is transferred to the reduction zone, and reduced under fluidized conditions. The reduced metal oxide is then withdrawn from the reduction zone, as a product of the process.

More particularly, and as a specific embodiment illustrative of the improved process of the present invention, a fluidized reaction system is provided which utilizes the reheated hot effluent gases from the fluidized reactor to preheat the incoming reducible metal oxide material in several stages of heat-transfer contacts and cyclones which separate the resulting gas-solids mixtures into their components. This metal oxide, for the sake of illustration, may comprise non-magnetic ore fines, such as hematite ($Fe_2O_3$). After conversion to magnetite ($Fe_3O_4$) in the reactor, the hot effluent solids from the reactor may be passed through several additional stages of heat-transfer contacts and cyclones, in order to preheat the incoming recycled reducing gases, and also fresh reducing gas, if this enters cold. These preheated gases may be further heated in a burner prior to entering the reactor. The partially cooled effluent solids from the cyclones may then be further cooled by water in a disperse-phase indirect heat exchanger, and may be air-stripped prior to discharge to the open air, if so desired, from a standpoint of personnel safety. Alternately, the partially cooler effluent solids may be further cooled in a fluidized bed cooler via direct injection of liquid water and atomizing gas into the bed of hot solids. The hot solids cause the water to vaporize and this in turn cools the solids to any desired temperature down to the dew point of the exit gases from the fluidized cooler. The vaporized water acts as fluidizing gas but, in addition, other reducing gas is injected to supplement the steam as fluidizing gas. In still another variation, the partially cooled effluent solids may be dropped directly into liquid cooling water to form a solids-water slurry, with the water being present in sufficient quantity to lower the temperature of the solids to about 125° F. For a 600° F. solids temperature, the weight of water required is about two to three times the weight of solids, so that a slurry of approximately 25 to 30 weight percent solids is formed. The reducing gas compositions, throughout the entire gas-solids system are controlled within equilibrium values so that over-reduction beyond the $Fe_3O_4$ point cannot occur.

The temperature conditions employed throughout the entire system, and the relationship of these temperatures with respect to the several steps comprising the improved process of the present invention, are critical to the extent of being able to effect substantially complete reduction of the metal oxide to the desired state, particularly when it is sought to effect the reduction of non-magnetic ores to magnetic (magnetite) ores. In this respect, the reduction reaction under fluidized conditions is carried out in the reduction zone at a temperature between about 800° F. and about 1400° F. Temperatures in this reduction zone between about 1000° F. and about 1200° F. are most satisfactorily employed for optimum results. Correspondingly, the gaseous effluent which is continually withdrawn from the reduction zone will exhibit temperatures within the general range of between about 800° F. and about 1400° F., depending, of course, upon the specific reduction temperatures existing within the reduction zone. In accordance with the improved process of the present invention, this gaseous effluent, as previously indicated, is heated to an elevated temperature. For this purpose, this effluent is generally heated to a temperature which is higher than the temperature within the aforesaid range and generally between about 1000° F. and about 2000° F., and preferably to a temperature of between about 1550° F. and about 1750° F. The thus-heated gaseous effluent is, as previously indicated, brought into contact with the mass of material sought to be reduced, and this heated effluent gas thus causes the mass of the metal oxide to be heated to an elevated temperature. After separation of the thus-heated metal oxide from the gaseous effluent by cyclones or other gas-solids separation devices, the heated material is then transferred to the reduction zone for the actual reduction to be completed. In a more specific aspect of the invention, if so desired, the withdrawn reduced metal oxide from the reduction zone may be brought into contact with the inlet reducing gas normally employed in this zone to cause this gas to be heated to an elevated temperature. This heated reducing gas is then separated from the reduced metal oxide and further heated to an elevated temperature within the range of between about 1000° F. and about 2000° F., and preferably between about 1550° F. and about 1750° F. (as in the case of reheating the aforementioned effluent gas) and the thus-heated reducing gas is then transferred to the reduction zone for use therein in effecting the reduction of the metal oxide material.

In another modification of the process of the present invention, a portion of the heated gaseous effluent, separated after heating the metal oxide to the elevated temperature, is admixed with the fresh reducing gas, and the resulting mixture is then transferred for use in the reduction zone. The effluent gas thus employed constitutes a source of relatively inert gas to serve as a heat carrier, and to facilitate the control of the composition of the reducing gas entering the reactor for the reduction of the metal oxide material.

In still another modification, a portion of the heated gaseous effluent, separated after heating the metal oxide to the elevated temperature, is cooled and condensed to form an aqueous phase and a gaseous phase. These phases are separated, and the gaseous phase is then admixed with the reducing gas, and the resulting mixture is transferred to the reduction zone, as indicated above, for use therein.

The process of the present invention makes possible the realization of improved heat economies, i.e., with respect to the ratio of B.t.u. employed per long ton of solids feed. Thus, it has been found that increased heat ratios of ore-to-gas are possible to accordingly increase the solid throughput capacity for a given size of cyclone. This higher heat ratio of ore-to-gas is made possible by the presence of the reheat step (as previously described) in which the temperature of the reactor effluent gases is raised from an exit temperature between about 800° F. and about 1400° F. to a temperature between about 1000° F. and about 2000° F. By virtue of this critical reheating step, almost complete thermal efficiency is obtained with any fuel combusted in the reheating zone, thereby contributing substantially to the over-all heat economy of the process.

Because of the single bed employed in the fluidized reactor, the solids retention time within the reactor can be easily varied by merely changing the bed height. In this respect, a 30 minute or even higher holdup time is possible. This feature allows greater flexibility with regard to different reaction rates that may be required employing different types of metal oxide, or ore feeds, so that the throughput may be maintained, even though the reaction rate were to be increased many times. The temperature of the reaction may also be varied, as required. When a relatively low temperature level is employed throughout the system, the quantity of gas employed should be raised in order to maintain the same gas velocity (which is governed by settling velocity considerations). The improved system of the present invention, it will be understood, is a gas-limited design, i.e., the actual circulating gas quantity for the unit is governed by the gas inlet velocity and the inlet area for the cyclone itself. In general, these cyclones are designed for an inlet gas velocity ranging from about 65 to 80 feet per second. At lower reaction temperatures, more solids can be processed through the same equipment inasmuch as not only is more weight of gas used, but less heat is required so that the solids throughput is enhanced. The reaction temperature, it will be noted, can be set at any value between about 800° F. and about 1400° F. by adjusting the solids flow rate, the reducing gas flow rate and the quantity of fuel combusted.

As indicated above, the heat requirements for the improved process of the present invention are supplied by burning fuel in the combustion chambers. For this purpose, a variety of fuels can be successfully employed, such as natural gas, liquid fuel oils or lean gas obtained from coal gasification processes. Thus, it is possible to employ one type of fuel for synthesis gas production and another fuel for heat requirements. The reducing gas employed for the reduction reaction may be made or obtained by various methods such as steam-methane reforming, coal gasification, or partial oxidation of oil or natural gas.

In order to provide a better understanding of the improved process of the present invention, reference is had to the accompanying drawing which forms a part of this specification, and as an example, illustrates, diagrammatically, one form of the apparatus employed and capable of carrying out a preferred embodiment of the invention. It should be understood, however, that it is not intended that the invention be limited to the embodiment or the example as illustrated, but is capable of other embodiments which may extend beyond the scope of the apparatus illustrated. Some of the mechanical elements necessary to effect the transfer of solids, liquids and vapors to maintain the necessary operating conditions for carrying out the functions of the apparatus, have been omitted in order to simplify the description.

Referring to the drawing, a raw, non-magnetic hematite ($Fe_2O_3$) ore feed, containing about 5 percent free moisture, ground to about 12 mesh top-size, and comprising approximately 30 percent iron, by weight, is introduced through conduit 10 at a temperature of about 77° F. and at the rate of 55 long tons per hour. The raw ore thus introduced through conduit 10 is brought into contact with hot reactor effluent gas obtained from cyclone 12 (as more fully hereinafter described) and withdrawn through conduit 14 at a temperature of 870° F. The contact between solids and gas results in a heat transfer in which the temperature of the solids is raised to about 250° F. and the temperature of the effluent gases from cyclone 12 is reduced to about 300° F. The velocity of the effluent gas in conduit 16 is preferably maintained at about 10 percent above the maximum settling velocity of the largest ore particle present in the feed. In the present example, where the ore feed is ground to about 12 mesh top-size, the gas velocity in conduit 16 is maintained at about 70 feet per second.

Following contact between raw ore solids from conduit 10 and hot effluent gases from conduit 14, the resulting mixture is transferred through heat-transfer conduit 16 to a cyclone 18 in which separation between solids and gases is effected. Gas, separated in cyclone 18, is withdrawn through conduit 20 at a temperature of about 300° F., to be handled as hereinafter discussed. Separated solids are withdrawn through conduit 22 at a temperature of about 250° F. The separated solids withdrawn from cyclone 18 through conduit 22 at a temperature of about 250° F. are next transferred through heat-transfer conduit 24, where they are contacted with hot effluent gas withdrawn from reactor 26, via conduit 28, and reheated with the gaseous combustion product withdrawn from reheater 30, via conduit 32. The effluent gases from reactor 26 are withdrawn, via conduit 28, at a temperature of about 1100° F. In order to reheat these gases, as indicated above, natural gas is introduced into reheater 30 via conduit 34, at the rate of 50.5 mols per hour. Air is introduced into reheater 30 via conduit 36 at the rate of 510 mols per hour. Following combustion of natural gas and air in reheater 30, the resulting combustion gases are withdrawn via conduit 32 at a temperature of about 3600° F. As a result of contact between combustion gases from reheater 30 and effluent gas withdrawn from reactor 26 via conduit 28, the temperature of the effluent gas is raised from about 1100° F., in conduit 28, to bout 1600° F. after mixing. The composition of the combined gases in conduit 24, is as follows:

| | Mole percent |
|---|---|
| CO | 0.6 |
| $CO_2$ | 11.4 |
| $H_2$ | 1.5 |
| $H_2O$ | 14.3 |
| $N_2$ | 72.2 |
| | 100.0 |

The contact of the separated solids withdrawn from cyclone 18 via conduit 22 at a temperature of about 250° F. with the hot gases in conduit 24 at a temperature of about 1600° F., results in raising the temperature of the solids in conduit 24 to about 820° F., and are transferred together with the gaseous products to cyclone 12. In cyclone 12, separation is effected between the heated solids which are withdrawn via conduit 14, as described above, and the preheated solids ($Fe_2O_3$) are transferred at a temperature of about 820° F. to reactor 26 via conduit 38. Reactor 26 is a fluidized-bed type reactor, provided with a perforated gas distribution grid 40, and is shown as having a fluid-bed level 42. Reactor 26 is also provided with an internal cyclone 44, for separating solids from gases, and is equipped with a dipleg 46 for the return of fine solids to the fluid-bed level.

The preheated hematite ore introduced into reactor 26 via conduit 38 is contacted with a reducing gas introduced into reactor 26 and withdrawn from a partial oxidation furnace 48 via conduit 50. This gas, introduced at the rate of 2160 mols per hour, has the following composition:

| | Mole percent |
|---|---|
| CO | 3.6 |
| $CO_2$ | 9.2 |
| $H_2$ | 3.7 |
| $H_2O$ | 10.6 |
| $N_2$ | 72.9 |
| | 100.0 |

To provide the required reducing gas for reactor 26, air is introduced into partial oxidation furnace 48 via conduit 52 at a temperature of 375° F. and at the rate of 775 mols per hour and a pressure of 45 p.s.i.a.; while natural gas is introduced into furnace 48, via conduit 54, at a temperature of about 100° F. and at a rate of 106 mols per hour. In reactor 26, the pre-heated non-magnetic hematite ($Fe_2O_3$) ore treated with the reducing gas introduced via conduit 50, is reduced to form the magnetic oxide magnetite ($Fe_3O_4$). This reaction, although it is technically a reduction reaction, is commonly referred to as a "magnetic roast." The reduced iron ore (magnetite) product is withdrawn from reactor 26 at a temperature of about 1100° F. via conduit 56, and may, as shown in the present embodiment, be transferred to suitable steam generation apparatus 68 to extract the heat values from the solids in the formation of steam which may be used for various purposes within the present system itself for the conservation of heat or energy, if so desired.

As previously indicated, the exit gas, separated in cyclone 18, is withdrawn through conduit 20 at the rate of approximately 3203 mols per hour and at a temperature of 300° F. This gas has the following composition:

| | Mole percent |
|---|---|
| CO | 0.5 |
| $CO_2$ | 9.7 |
| $H_2$ | 1.3 |
| $H_2O$ | 27.2 |
| $N_2$ | 61.3 |
| | 100.0 |

The exit gas in conduit 20 is next divided into two separate streams. Approximately 44 percent of this exit gas is withdrawn from conduit 20 via conduit 21 and vented to the atmosphere. The remaining portion of the gas stream in conduit 20 is next subjected to a scrubbing and quenching treatment, and for this purpose is transferred through this conduit to gas scrubber 60. Cooling water is introduced into scrubber 60 via conduit 62. As a result of the scrubbing and quenching action in scrubber 60, entrained material present in the introduced gas is separated, and water vapor is condensed with the formation of an aqueous phase and a gaseous phase. The aqueous phase thus formed is withdrawn from scrubber 60 through conduit 64, and thus removed from the system. The gaseous phase, substantially free of entrained material and water vapor, is withdrawn at a temperature of about 100° F. through conduit 66. This gaseous phase is divided into two separate streams. Approximately 10 percent of this clean scrubbed gas is withdrawn from conduit 66 via conduit 58 to serve as fluidizing gas in the steam generation unit 68, wherein steam is produced and the reduced product from reactor 26 is cooled from about 1100° F. to about 600° F. and withdrawn from the system via conduit 70. Water employed for generating steam in unit 68 is introduced into the system via conduit 71. Steam is withdrawn from the unit 68 via conduit 72 and may be used within the present system or for other purposes. The gases from the gas scrubber 60, which were introduced into unit 68 via conduit 58, are withdrawn from the system via conduit 74 and vented to the atmosphere. The purpose of this gas is to maintain a fluidized bed in the steam unit 68. The remaining portion of the gas stream in conduit 66 may be transferred to partial oxidation furnace 48 for admixture with the reducing gas in the furnace and thus facilitate the control of the composition of the reducing gas, subsequently transferred to reactor 26 through conduit 50. In the embodiment described above, the entire system is maintained at a pressure between about 15 and about 25 p.s.i.g., because this pressure decreases the volume of gas and thus increases the throughput capacity of a given size of equipment. In operation, the pressure imposed upon this system is set by the pressure build-up that can be obtained by a specific height of the feed-solids standpipe, as shown in conduit 10, and also by the design of external cyclones 12 and 18. However, by the use of lock-hoppers to feed solids into the system, operation at still higher pressures is possible. It will be understood, also, that the various flow rates, discussed above, are those in which only one "train" of cyclones, as shown in the drawings, is employed. It is within the scope of the present invention, to employ such additional trains, if desired, and these additional trains may be added in parallel to increase the capacity of the system. However, even in such modifications only a single reactor and a single gas scrubber will have to be employed. It will also be noted, in this connection, that while the use of cyclones has been indicated as a preferred apparatus for separation of solids and gases, other separating devices may also be successfully employed for this purpose, such as filters or centrifuges, if so desired. Also, whereas this embodiment indicates two heat transfer contacts between cold inlet solids and reheated effluent gas, in other instances it may be desirable to use one, two or three or more heat transfer contacts.

As indicated above, the process of the present invention, in the example illustrated, has a preferred applicability for the up-grading or reduction of other metal oxides, such as the oxides of copper, nickel or manganese, if so desired, in a manner similar to that described above. In addition, it should be noted that while the particular embodiment of the improved process of the present invention has been described for purposes of illustration, various modifications and adaptations thereof, which will be obvious to those skilled in the art may be made within the spirit of the invention and without departing from its scope.

We claim:
1. In a method for the reduction of non-magnetic iron-containing material to obtain $Fe_3O_4$ in which the reduction is carried out in a fluidized bed reduction zone, the improvement which comprises:
   (a) maintaining a fluidized bed of said material in particulate form in said reduction zone at a temperature between about 800 and about 1400° F.;
   (b) introducing into said reduction zone a reducing gas stream having reducing and oxidizing components and having a fixed composition within equilibrium values for the reducing and oxidizing components of the gas at the reduction temperature within the aforementioned range so that over-reduction beyond the $Fe_3O_4$ point cannot occur;
   (c) withdrawing a gaseous effluent of low calorific value from said reduction zone at a temperature within the aforementioned range;
   (d) combusting a suitable fuel and admixing the gaseous combustion products and said gaseous effluent of low calorific value in sufficient relative quantity to heat the said gaseous effluent to an elevated temperature between about 1000 and about 2000° F.;
   (e) contacting a mass of relatively cool iron-containing particles and said thus-heated effluent to cause said mass to be heated to an elevated temperature, separating said heated particles from said gaseous effluent, transferring said particles to said reduction zone, and withdrawing particles reduced to $Fe_3O_4$ from said reduction zone.
2. The process of claim 1 in which said non-magnetic iron-containing material comprises $Fe_2O_3$.
3. The process of claim 1 in which said reducing and oxidizing components of said reducing gas stream comprise carbon monoxide and carbon dioxide, respectively.
4. The process of claim 1 in wihch said reducing and oxidizing components of said reducing gas stream comprise hydrogen and water, respectively.
5. In a method for the reduction of non-magnetic iron oxide contained in an iron ore to obtain $Fe_3O_4$ in which the reduction is carried out in a fluidized bed reduction zone, the improvement which comprises:
   (a) maintaining a fluidized bed of said ore in particulate form in said reduction zone at a temperature between about 1000 and about 1200° F.;
   (b) introducing into said reduction zone a reducing gas stream having reducing and oxidizing components and having a fixed composition within equilibrium values for the reducing and oxidizing components of the gas at the reduction temperature within the aforementioned range so that over-reduction beyond the $Fe_3O_4$ point cannot occur;
   (c) withdrawing a gaseous effluent of low calorific value from said reduction zone at a temperature within the aforementioned range;
   (d) combusting a suitable fuel and admixing the gaseous combustion products and said gaseous effluent of low calorific value in sufficient relative quantity to heat the said gaseous effluent to an elevated temperature between about 1000 and about 2000° F.;
   (e) contacting a mass of relatively cool ore particles and said thus-heated effluent to cause said mass to be heated to an elevated temperature, separating said heated particles from said gaseous effluent, transferring said particles to said reduction zone, and withdrawing particles reduced to $Fe_3O_4$ from said reduction zone.
6. The method of claim 5 in which said gaseous effluent of low calorific value defined in paragraph (c) is heated to a temperature between about 1550 and about 1750° F.
7. In a method for the reduction of non-magnetic iron oxide contained in an iron ore to obtain $Fe_3O_4$ in which the reduction is carried out in a fluidized bed reduction zone, the improvement which comprises:
   (a) maintaining a fluidized bed of said ore in particulate form in said reduction zone at a temperature between about 800 and about 1400° F.;
   (b) introducing into said reduction zone a reducing gas stream having reducing and oxidizing components and having a fixed composition within equilibrium values for the reducing and oxidizing components of the gas at the reduction temperature within the aforementioned range so that over-reduction beyond the $Fe_3O_4$ point cannot occur;
   (c) withdrawing a gaseous effluent of low calorific value from said reduction zone at a temperature within the aforementioned range;

(d) combusting a suitable fuel and admixing the gaseous combustion products and said gaseous effluent of low calorific value in sufficient relative quantity to heat the said gaseous effluent to an elevated temperature between about 1000 and about 2000° F.;

(e) contacting a mass of relatively cool ore particles and said thus-heated effluent to cause said mass to be heated to an elevated temperature, separating said heated particles from said gaseous effluent, transferring said particles to said reduction zone, and withdrawing particles reduced to $Fe_3O_4$ from said reduction zone;

(f) contacting said withdrawn particles with said reducing gas stream defined in paragraph (b) to cause said stream to be heated to an elevated temperature; separating thus-heated reducing gas from said particles and transferring such gas to said reduction zone.

8. In a method for the reduction of non-magnetic iron oxide contained in an iron ore to obtain $Fe_3O_4$ in which the reduction is carried out in a fluidized bed reduction zone, the improvement which comprises:

(a) maintaining a fluidized bed of said ore in particulate form in said reduction zone at a temperature between about 800 and about 1400° F.;

(b) introducing into said reduction zone a reducing gas stream having reducing and oxidizing components and having a fixed composition within equilibrium values for the reducing and oxidizing components of the gas at the reduction temperature within the aforementioned range so that over-reduction beyond the $Fe_3O_4$ point cannot occur.

(c) withdrawing a gaseous effluent of low calorific value from said reduction zone at a temperature within the aforementioned range;

(d) combusting a suitable fuel and admixing the gaseous combustion products and said gaseous effluent of low calorific value in sufficient relative quantity to heat the said gaseous effluent to an elevated temperature between about 1000 and about 2000° F.;

(e) contacting a mass of relatively cool ore particles and said thus-heated effluent to cause said mass to be heated to an elevated temperature, separating said heated particles from said gaseous effluent, transferring said particles to said reduction zone, and withdrawing particles reduced to $Fe_3O_4$ from said reduction zone;

(f) contacting said withdrawn particles with said reducing gas stream defined in paragraph (b) to cause said stream to be heated to an elevated temperature; separating thus-heated reducing gas from said particles; further heating said gas to a temperature between about 1000 and about 2000° F.; and introducing said thus-heated gas to said reduction zone.

9. In a method for the reduction of non-magnetic iron oxide contained in an iron ore to obtain $Fe_3O_4$ in which the reduction is carried out in a fluidized bed reduction zone, the improvement which comprises:

(a) maintaining a fluidized bed of said ore in particulate form in said reduction zone at a temperature between about 800 and about 1400° F.;

(b) introducing into said reduction zone a reducing gas stream having reducing and oxidizing components and having a fixed composition within equilibrium values for the reducing and oxidizing components of the gas at the reduction temperature within the aforementioned range so that over-reduction beyond the $Fe_3O_4$ point cannot occur;

(c) withdrawing a gaseous effluent of low calorific value from said reduction zone at a temperature within the aforementioned range;

(d) combusting a suitable fuel and admixing the gaseous combustion products and said gaseous effluent of low calorific value in sufficient relative quantity to heat the said gaseous effluent to an elevated temperature between about 1000 and about 2000° F.;

(e) contacting a mass of relatively cool ore particles and said thus-heated effluent to cause said mass to be heated to an elevated temperature, separating said heated particles from said gaseous effluent, transferring said particles to said reduction zone, and withdrawing particles reduced to $Fe_3O_4$ from said reduction zone;

(f) mixing a portion of said separated gaseous effluent with a reducing gas to obtain the said reducing gas stream defined in paragraph (b).

10. In a method for the reduction of non-magnetic iron oxide contained in an iron ore to obtain $Fe_3O_4$ in which the reduction is carried out in a fluidized bed reduction zone, the improvement which comprises:

(a) maintaining a fluidized bed of said ore in particulate form in said reduction zone at a temperature between about 800 and about 1400° F.;

(b) introducing into said reduction zone a reducing gas stream having reducing and oxidizing components and having a fixed composition within equilibrium values for the reducing and oxidizing components of the gas at the reduction temperature within the aforementioned range so that over-reduction beyond the $Fe_3O_4$ point cannot occur;

(c) withdrawing a gaseous effluent of low calorific value from said reduction zone at a temperature within the aforementioned range;

(d) combusting a suitable fuel and admixing the gaseous combustion products and said gaseous effluent of low calorific value in sufficient relative quantity to heat the said gaseous effluent to an elevated temperature between about 1000 and about 2000° F.;

(e) contacting a mass of relatively cool ore particles and said thus-heated effluent to cause said mass to be heated to an elevated temperature, separating said heated particles from said gaseous effluent, transferring said particles to said reduction zone, and withdrawing particles reduced to $Fe_3O_4$ from said reduction zone;

(f) cooling and condensing at least a portion of said separated gaseous effluent to form an aqueous phase and a gaseous phase, and mixing said gaseous phase with a reducing gas to obtain the said reducing gas stream defined in paragraph (b).

11. In a method for the reduction of non-magnetic iron oxide contained in an iron ore to obtain $Fe_3O_4$ in which the reduction is carried out in a fluidized bed reduction zone, the improvement which comprises:

(a) maintaining a fluidized bed of said ore in particulate form in said reduction zone at a temperature between about 800 and about 1400° F.;

(b) introducing into said reduction zone a reducing gas stream having reducing and oxidizing components and having a fixed composition within equilibrium values for the reducing and oxidizing components of the gas at the reduction temperature within the aforementioned range so that over-reduction beyond the $Fe_3O_4$ point cannot occur;

(c) withdrawing a gaseous effluent of low calorific value from said reduction zone at a temperature within the aforementioned range;

(d) combusting a suitable fuel and admixing the gaseous combustion products and said gaseous effluent of low calorific value in sufficient relative quantity to heat the said gaseous effluent to an elevated temperature between about 1000 and about 2000° F.;

(e) contacting a mass of relatively cool ore particles and said thus heated effluent to cause said mass to be heated to an elevated temperature, separating said heated particles from said gaseous effluent, transferring said particles to said reduction zone, and withdrawing particles reduced to $Fe_3O_4$ from said reduction zone;

(f) cooling and condensing a portion of said separated gaseous effluent to form an aqueous phase and a gaseous phase, mixing said gaseous phase with a reducing gas to obtain the said reducing gas stream defined in paragraph (b), contacting said reducing gas stream and said particles reduced to $Fe_3O_4$ to cause said gas stream to be heated to an elevated temperature, and transferring said gas stream to said reduction zone.

12. In a method for the reduction of non-magnetic iron-containing material to obtain $Fe_3O_4$ in which the reduction is carried out in a fluidized bed reduction zone, the improvement which comprises:

(a) maintaining a fluidized bed of said material in particulate form in said reduction zone at a temperature between about 800 and about 1400° F.;

(b) introducing into said reduction zone a reducing gas stream having reducing and oxidizing components and having a fixed composition within equilibrium values for the reducing and oxidizing components of the gas at the reduction temperature within the aforementioned range so that over-reduction beyond the $Fe_3O_4$ point cannot occur;

(c) withdrawing a gaseous effluent of low calorific value from said reduction zone at a temperature within the aforementioned range;

(d) combusting a suitable fuel and admixing the gaseous combustion products and said gaseous effluent of low calorific value in sufficient relative quantity to heat the said gaseous effluent to an elevated temperature between about 1000 and about 2000° F.;

(e) contacting a mass of relatively cool iron-containing particles and said thus-heated effluent to cause said mass to be heated to an elevated temperature, separating said heated particles from said gaseous effluent, transferring said particles to said reduction zone, and withdrawing particles reduced to $Fe_3O_4$ from said reduction zone;

(f) utilizing sensible heat in said particles reduced to $Fe_3O_4$ for the generation of steam, and employing steam thus-generated for use within the process.

References Cited in the file of this patent

UNITED STATES PATENTS

| | | |
|---|---|---|
| 2,048,112 | Gahl | July 21, 1936 |
| 2,398,443 | Munday | Apr. 16, 1946 |
| 2,990,269 | Hyde | June 27, 1961 |
| 2,997,383 | Whaley | Aug. 22, 1961 |

OTHER REFERENCES

Iron and Steel Engineer, January 1958, pages 69–78.